United States Patent
Kim

[11] Patent Number: 5,952,752
[45] Date of Patent: Sep. 14, 1999

[54] HEMISPHERICAL DYNAMIC PRESSURE BEARING

[75] Inventor: Seung-Gon Kim, Seoul, Rep. of Korea

[73] Assignee: Samsung Electronics Co., Ltd., Suwon, Rep. of Korea

[21] Appl. No.: 08/984,682

[22] Filed: Dec. 3, 1997

[30] Foreign Application Priority Data

Dec. 4, 1996 [KR] Rep. of Korea ................. 96-45596

[51] Int. Cl.[6] ............................................. H02K 5/16
[52] U.S. Cl. ................... 310/90; 310/90.5; 384/107; 384/108
[58] Field of Search ................... 310/90, 90.5; 384/107, 384/108

[56] References Cited

U.S. PATENT DOCUMENTS 5,760,509  6/1998  Chung ........................... 310/90
5,801,464  9/1998  Brezoczky ..................... 310/67 R
5,883,453  3/1999  Choi ............................. 310/90

*Primary Examiner*—Nestor Ramirez
*Assistant Examiner*—Thanh Lam
*Attorney, Agent, or Firm*—Burns, Doane, Swecker & Mathis, L.L.P.

[57] ABSTRACT

A motor includes a rotor bushing having first and second hemispherical grooves formed on top and bottom surfaces thereof, first and second hemispherical bearings inserted into the first and second hemispherical grooves, respectively, and a supporting shaft extending through the rotor bushing and fixed to the first and second hemispherical bearings. Respective heights of the first and second hemispherical grooves measured in the axial direction of the shaft are different from (i.e., are either greater than or less than) the axial depths of the first and second hemispherical grooves, respectively.

2 Claims, 5 Drawing Sheets

HEMISPHERICAL DYNAMIC PRESSURE BEARING

BACKGROUND OF THE INVENTION

1. Field of the Invention

The present invention relates to a motor having a hemispherical dynamic pressure bearing.

2. Brief Description of Related Art

Generally, a dynamic pressure bearing comprises a supporter, and a rotating member eccentrically and rotatably supported by the supporter. Pressure is formed by lubricant fluid within a gap defined between the supporter and the rotating member so as to enhance the rotation of the rotating member.

Particularly, a hemispherical dynamic bearing is designed such that a portion thereof for supporting the rotating member is hemispherically-shaped so as to simultaneously support a radial load and a thrust load.

Accordingly, since there is no need for a plurality of bearings for supporting each load, it is possible to make the bearing compact. In addition, when using air as fluid for forming lubricant pressure for the dynamic bearing, a seal member is not required such that the bearing can be made in a more compact state. This compact bearing is suitable for use in a motor used in electronic products.

Especially, with regard to a laser beam printer, laser beams are used to perform a printing operation. That is, a scanned image is formed on a photosensitive drum, which is responsive to light, by radiating the laser beams thereon. A rotating multi-faceted mirror system is provided to move the beams at a uniform velocity such that the beams are aligned with an axial direction of the photosensitive drum.

Referring to FIG. 1, there is shown a sectional view illustrating a conventional rotating multi-faceted mirror.

As shown in FIG. 1, the rotating multi-faceted mirror system 10 comprises a multi-faceted mirror 11 for reflecting laser beams to a photoconductive drum (not shown), a motor 20 for rotatably supporting the multi-faceted mirror 11, and a cover for receiving the multi-faceted mirror 11 and the motor 20. The multi-faceted mirror reflects laser beams through a hole 12a formed in the cover 12. The motor 20 includes a stator 21 and a rotor 22 which electromagnetically cooperate with each other. The stator 21 has a stator frame 21a, and a stator coil 21b wound around the stator frame 21a. The rotor 22 has a rotor bushing 22a, and a rotor magnet 22b mounted around the rotor bushing 22a. Mounted on an upper side of the rotor bushing 22a is a multi-faceted mirror bracket 13 fixedly supporting the multi-faceted mirror such that the multi-faceted mirror 11 rotates with the rotating bushing 22a. Inserted into upper and lower portions of the rotor bushing 22a are respective upper and lower hemispherical bearings 24a and 24b. The upper and lower hemispherical bearings 24a and 24b are fixed on a supporting shaft 23 mounted on a central portion of the stator frame 21a. The upper and lower hemispherical bearings 24a and 24b are disposed such that their rounded portions are facing each other. In addition, a plurality of grooves (not shown) are formed on the outer circumference of each of the upper and lower hemispherical bearings 24a and 24b so that air can be induced between the rotor bushing 22a and the upper and lower hemispherical bearings 24a and 24b as lubricant air enhancing the rotation.

The hemispherical bearing and the rotor bushing are described in more detail with reference to FIG. 2.

As shown in FIG. 2, the rotor bushing 22a is provided at its top and bottom with upper and lower hemispherical grooves 25a and 25b, respectively and a communicating hole 26 connecting the upper and lower hemispherical grooves 25a and 25b to each other. Edges 27a and 27a' of the upper and lower hemispherical grooves 25a and 25b are chamfered, and upper and lower edges 27b and 27b, of the communicating hole 26 are also chamfered, such that the upper and lower hemispherical bearings 24a and 24b can be easily inserted into the grooves. The upper and lower hemispherical bearings 24a and 24b are respectively provided with coupling holes 29 and 291 through which the supporting shaft 23 passes. Edges 27c and 27c' of flat surfaces 30a and 30b of the upper and lower hemispherical bearings 24a and 24b are also chamfered.

In the conventional rotating multi-faceted mirror system 10 structured as described above, when electric power is not applied thereto, the lower hemispherical bearing 24b contacts the lower hemispherical groove 25b by a gravitational force applied to the rotor busing 22a, while the upper hemispherical bearing 24a is spaced away from the upper hemispherical groove 25a. In this state, if electric power is applied for rotating the rotor bushing 22a, air is induced between the rotor bushing 22a and the upper and lower hemispherical bearings 24a and 24b, thereby raising the rotor bushing 22a. That is, the rotor bushing 22a becomes minutely spaced away from the lower hemispherical bearing 24b by pressure formed therebetween and caused by an eccentric coupling between the upper and lower hemispherical bearings 24a and 24b and the rotor bushing 22a. At this point, the flat surfaces 30a and 30b of the upper and lower hemispherical bearings 24a and 24b are located in the same planes as the upper and lower ends of the rotor bushing 22a, respectively.

However, in the above described structure, because of the chamfered portions, the acting area (interface) between the hemispherical bearings and the rotor bushing is decreased, thereby reducing a rotational supporting efficiency of the hemispherical bearing. As a result, the rotation between the hemispherical bearing and the rotor bushing cannot be smoothly realized, whereby the surfaces of the interface become prematurely worn.

SUMMARY OF THE INVENTION

The present invention has been made in an effort to solve the above described problems of the conventional hemispherical bearing.

It is an object of the present invention to provide a motor having first and second hemispherical bearings, in which an acting area (interface) between a rotor busing and the first and second hemispherical bearings is maximized, thereby reducing wear of the acting area.

This and other objects of the present invention can be achieved with a motor comprising a rotor bushing having first and second hemispherical grooves formed on top and bottom surfaces of the rotor bushing, said rotor bushing having an axis; first and second hemispherical bearings inserted into the first and second hemispherical grooves, respectively, with a predetermined space formed therebetween during operation, each of the first and second hemispherical bearings having the same axis as that of the rotor busing; and a supporting shaft penetrating through the rotor bushing and the first and second hemispherical bearings, the supporting shaft having the same axis as those of the rotor bushing and the first and second hemispherical bearings, wherein heights of the first and second hemispherical bearings in a direction of the axis are different from depths of the first and second hemispherical grooves in the direction of the axis.

According to one aspect of the present invention, the heights of the first and second hemispherical bearings are longer than the depths of the first and second hemispherical grooves, respectively, such that the first and second hemispherical bearings extend out of the first and second hemispherical grooves, respectively. Each edge of the flat surfaces of the first and second hemispherical bearings is chamfered.

According to another aspect of the present invention, the heights of the first and second hemispherical bearings are less than the depths of the first and second hemispherical grooves, respectively, such that top and bottom of the rotor bushing extend out of the first and second hemispherical bearings, respectively. Each edge of the top and bottom surfaces is chamfered.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF THE PREFERRED EMBODIMENTS OF THE INVENTION

Preferred embodiments of the present invention will now be described in detail with reference to the accompanying drawings.

Figure 1:
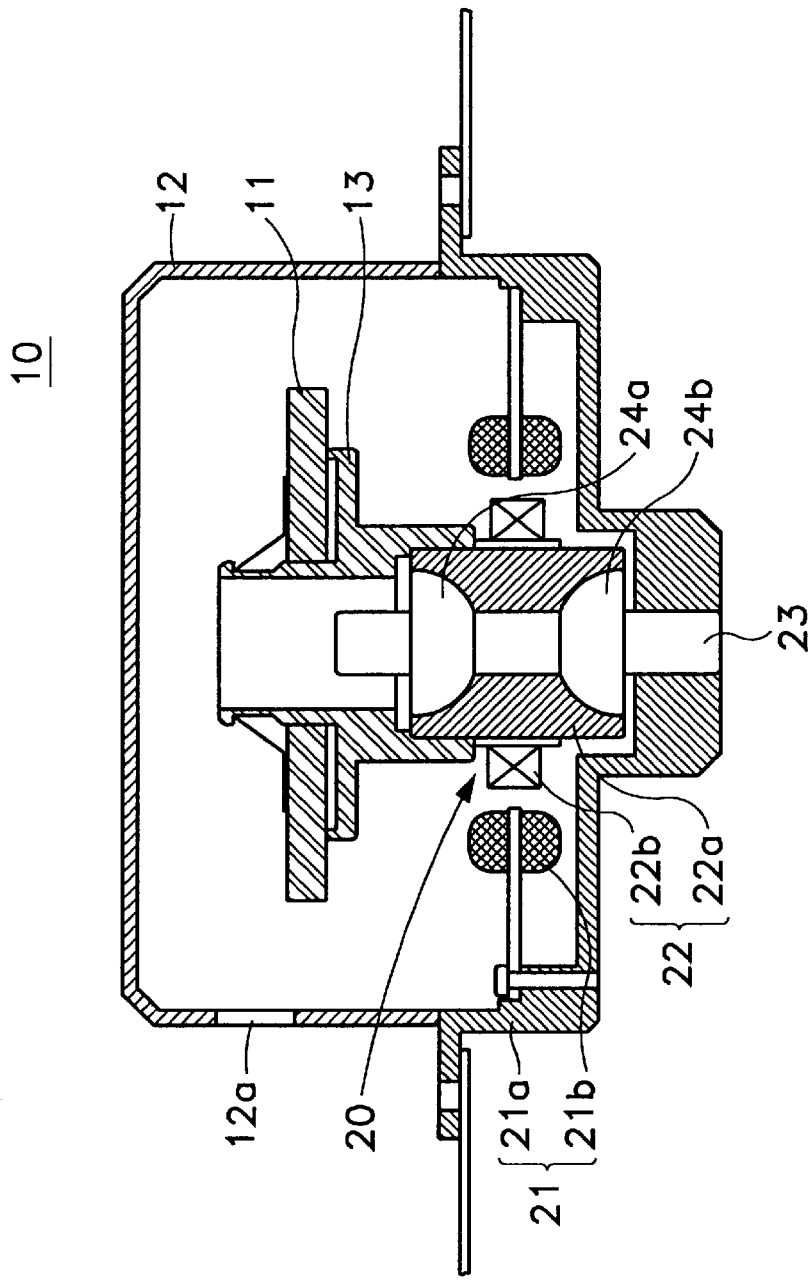
FIG. 1 is a vertical sectional view of a rotating multi-faceted mirror system where a conventional motor is employed.
Figure 2:
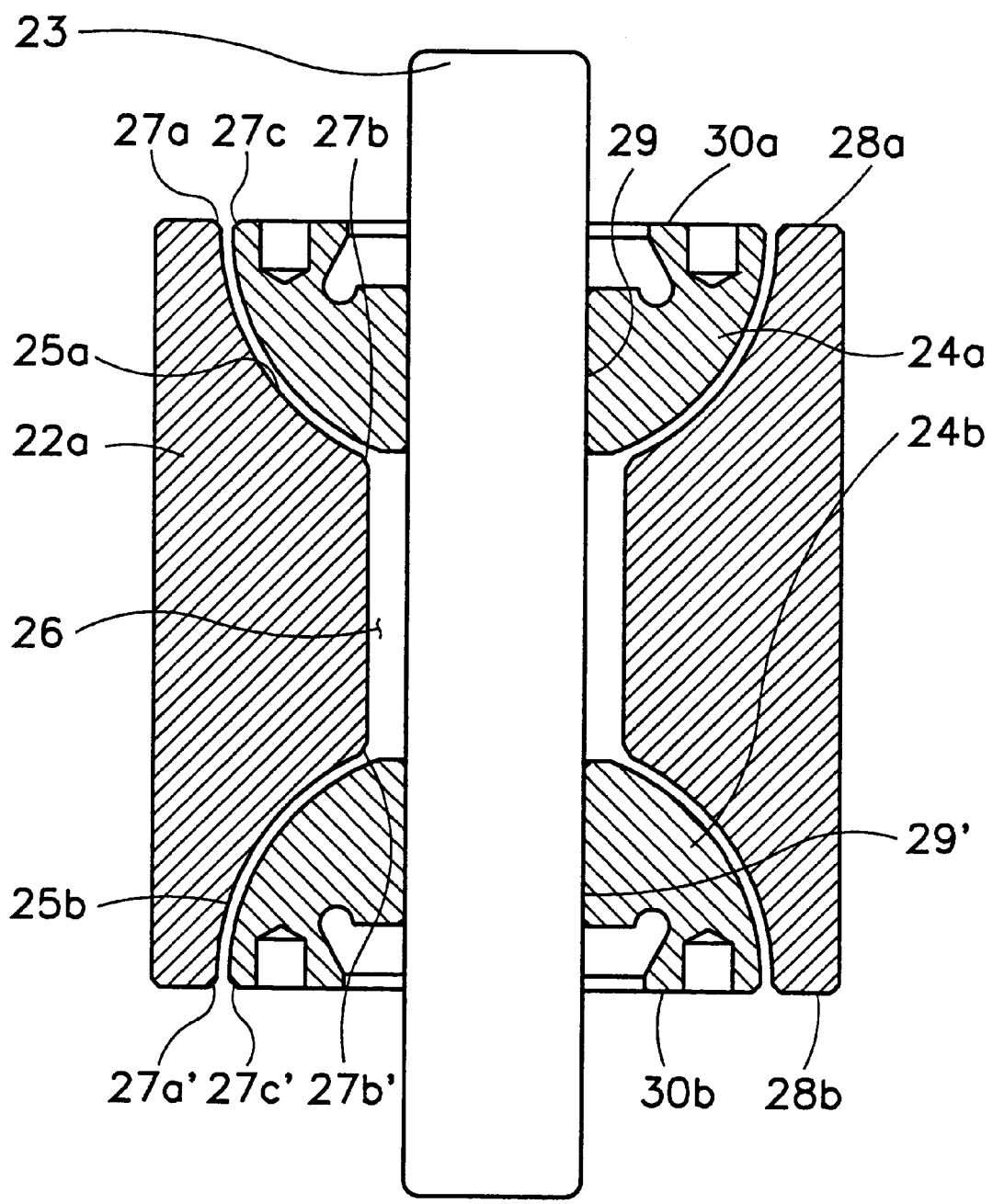
FIG. 2 is a vertical sectional view illustrating conventional hemispherical bearings and rotor bushing.
Figure 3:
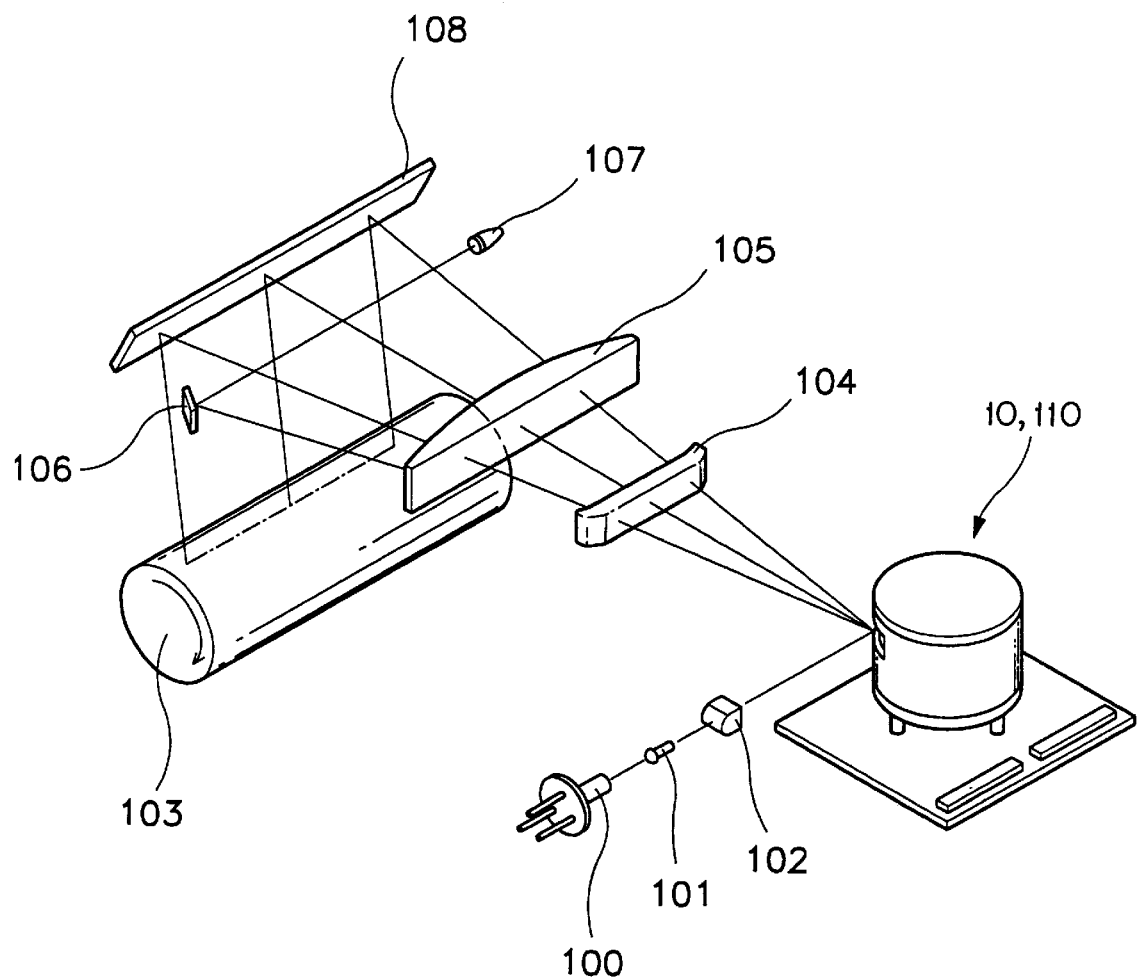
FIG. 3 is a schematic perspective view illustrating a conventional laser printer arrangement in which the present invention could be applied.

Referring first to FIG. 3, there is shown a schematic perspective view illustrating a conventional laser printer where the inventive hemispherical bearing can be used.

As shown in FIG. 3, the laser beam printer comprises a semiconductor laser 100 and a collimate lens 101 for converting light from the semiconductor laser 100 into laser beams. The laser beam printer further comprises a rotating multi-faceted mirror system 110 for converting the laser beams into a fan beam, and a cylindrical lens 102 disposed between the multi-faceted mirror system 100 and the collimate lens 101.

There is provided a photosensitive drum 103 for recording a print information pattern via the multi-faceted mirror system 110. Disposed between the multi-faceted lens system 110 and the photosensitive drum 103 are, in order, a spherical lens 104, a toric lens 105, a horizontal synchronizing lens 106, a detecting sensor 107, and a reflector 108.

Beams are radiated toward the photosensitive drum 103 at a uniform velocity by multi-faceted lens system 110, pass through the spherical lens 104 to be focused on the photosensitive drum 103, and are reflected onto desired positions on the photosensitive drum 103 by the reflector 108. Further, the horizontal synchronizing lens 106 and the detecting sensor 107 are used to ensure that the beams are radiated at equal horizontal positions on the photosensitive drum 103.

Figure 4:
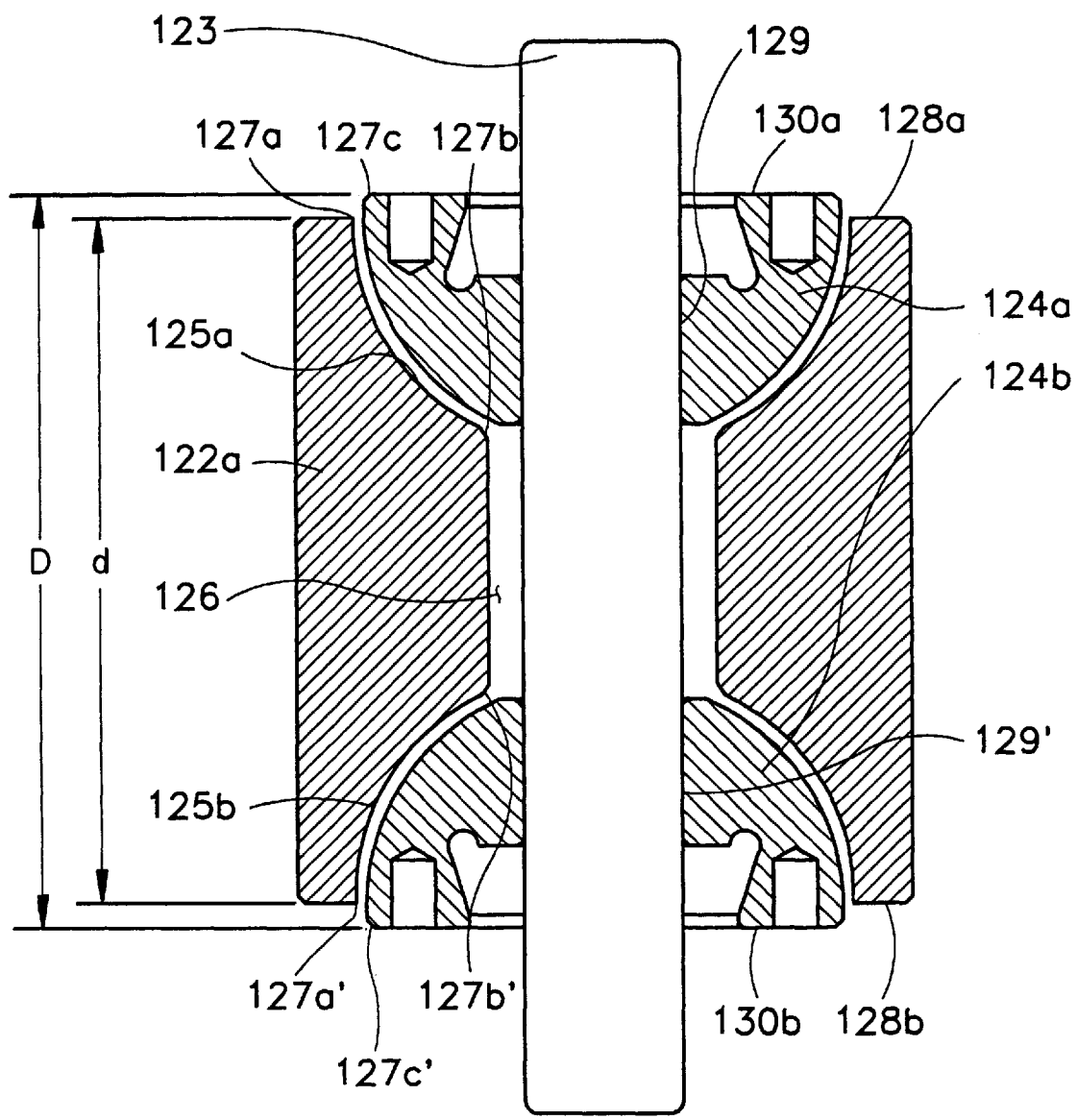
FIG. 4 is a vertical sectional view illustrating hemispherical bearings and a rotor bushing according to a first embodiment of the present invention.

FIG. 4 shows a sectional view illustrating hemispherical bearings and a rotor bushing according to a first embodiment of the present invention.

As shown in FIG. 4, a rotor bushing 122a is provided at its top and bottom surfaces with upper and lower hemispherical grooves 125a and 125b and a communicating hole 126 connecting the upper and lower grooves 125a and 125b.

Edges 127b and 127b' of upper and lower ends of the communicating hole 126 are chamfered for eliminating any burrs formed thereon during manufacture, such that the supporting shaft 123 can be easily inserted thereinto. However, inlet edges 127a and 127a' of the upper and lower hemispherical grooves 125a and 125b are not chamfered. The upper and lower hemispherical bearings 125a and 125b are provided with coupling holes 129 and 129', respectively, through which the supporting shaft 123 is inserted. Outer peripheral edges 127c and 127c' of flat end surfaces 130a and 130b of the upper and lower hemispherical bearings 124a and 124b are chamfered. In this embodiment, an axial height of each of the upper and lower hemispherical bearings 124a and 124b is enlarged so as to be longer than an axial depth of a respective one of the upper and lower hemispherical grooves 125a and 125b. Thus, an axial distance D between the end surfaces 130a, 130b of the bearings is greater than an axial distance d between the top and bottom surfaces 128a, 128b of the bushing 122a, whereby the end surfaces 130a, 130b are disposed out of the grooves 125a, 125b, respectively.

In the above described rotating multi-faceted mirror system 110, when electric power is not applied thereto, the lower hemispherical bearing 124b contacts the lower hemispherical groove 125b by a gravitational force applied to the rotor busing 122a, while the upper hemispherical bearing 124a is spaced away from the upper hemispherical groove 125a. In this state, if electric power is applied for rotating the rotor bushing 122a, air is induced between the rotor bushing 122a and the upper and lower hemispherical bearings 124a and 124b, thereby raising the rotor bushing 122a. That is, the rotor bushing 122a becomes minutely spaced away from the lower hemispherical bearing 124b by pressure formed therebetween caused by an eccentric coupling between the upper and lower hemispherical bearings 124a and 124b and the rotor bushing 122a. At this point, since the axial heights of the upper and lower hemispherical bearings 124a and 124b are longer than the axial depths of the upper and lower hemispherical grooves 125a and 125b, respectively, the upper and lower hemispherical bearings 124a and 124b extend out of the inlet of the upper and lower grooves 125a and 125b, respectively. As a result, even though the edges 127c and 127c' are chamfered, the chamfered portions do not contact the upper and lower hemispherical grooves 125a and 125b, whereby the size of the acting area (interface) is not reduced.

Figure 5:
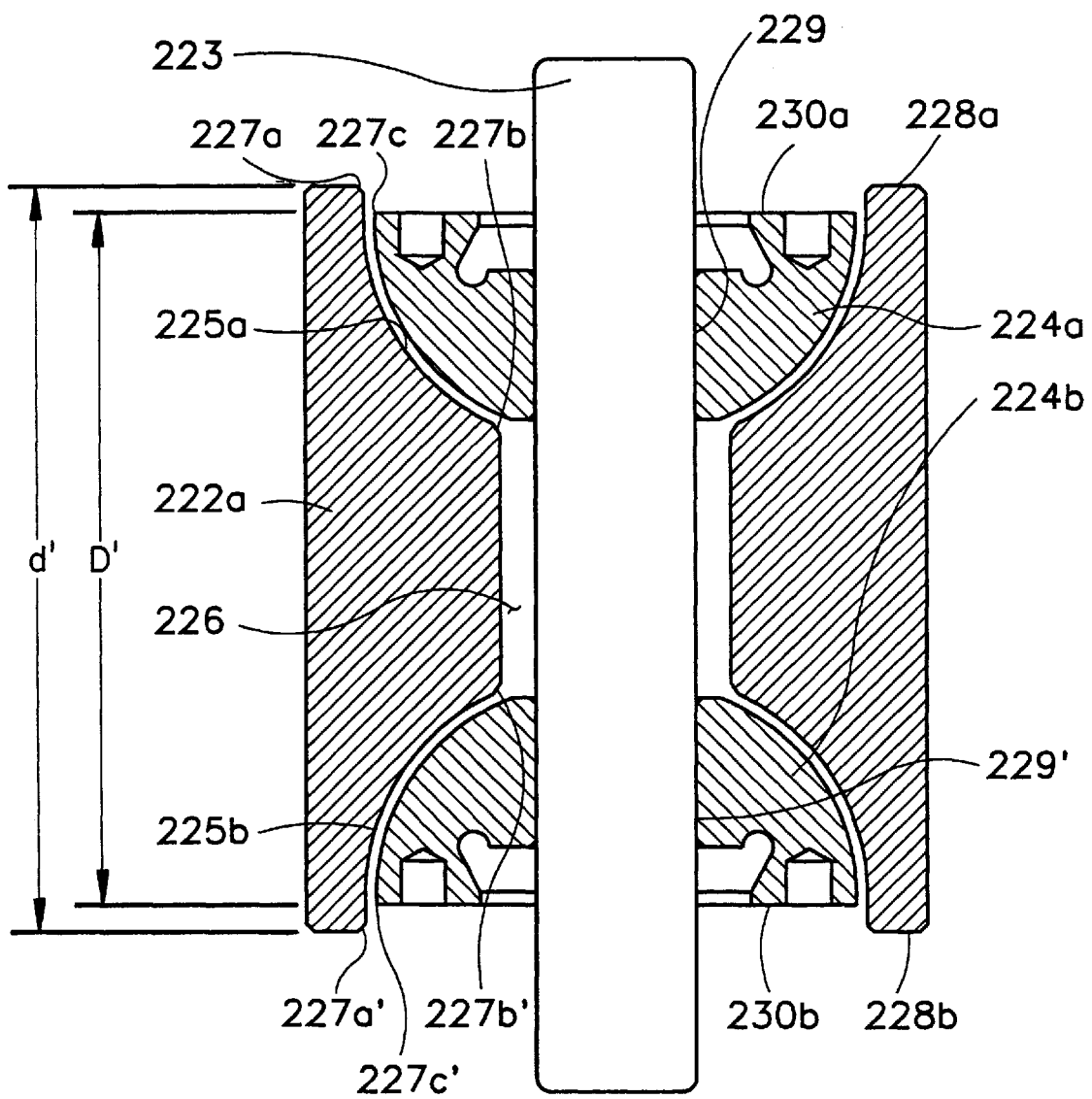
FIG. 5 is a vertical sectional view illustrating hemispherical bearings and a rotor bushing according to a second embodiment of the present invention.

FIG. 5 shows hemispherical bearings and a rotor bushing according to a second embodiment of the present invention.

As shown in FIG. 5, a rotor bushing 222a is provided at its top and bottom surfaces with hemispherical grooves 225a and 225b and a communicating hole 226 connecting the upper and lower grooves 225a and 225b to each other.

Edges 227a and 227a, of inlets of the upper and lower hemispherical grooves 225a and 225b are chamfered for eliminating any burrs formed thereon during manufacture, such that upper and lower hemispherical bearings 224a and 224b can be easily inserted thereinto. The edges 227a and 227a' are formed by the intersections of the grooves 225a, 225b with their respective top and bottom surfaces 228a, 228b. In addition, edges 227b and 227b' of upper and lower ends of the communicating hole 226 are also chamfered so that the supporting shaft 223 can be easily inserted thereinto. However, edges 227c, 227c' of flat end surfaces 230a and 230b of the upper and lower hemispherical bearings 224a and 224b are not chamfered. The upper and lower hemispherical bearings 225a and 225b are provided with coupling holes 229 and 229', respectively, through which the supporting shaft 223 is inserted. In this embodiment, the axial depth of each of the upper and lower hemispherical grooves 225a and 225b is enlarged so as to be longer than the axial height of respective ones of the upper and lower hemispherical bearings 224a and 224b. Thus, an axial distance d' between the top and bottom surfaces 228a, 228b of the bushing 222a is greater than an axial distance D' between the end surfaces 230a, 230b of the bearings, whereby the top and bottom surfaces 228a, 228b are disposed axially beyond the end surfaces 230a, 230b.

In the above described rotating multi-faceted mirror system 110, when electric power is not applied thereto, the lower hemispherical bearing 224b contacts the lower hemispherical groove 225b by a gravitational force applied to the rotor busing 222a, while the upper hemispherical bearing 224a is spaced away from the upper hemispherical groove 225a. In this state, if electric power is applied for rotating the rotor bushing 222a, air is induced between the rotor bushing 222a and the upper and lower hemispherical bearings 224a and 224b, thereby rising the rotor bushing 222a. That is, the rotor bushing 222a becomes minutely spaced away from the lower hemispherical bearing 224b by pressure formed therebetween caused by an eccentric coupling between the upper and lower hemispherical bearings 224a and 224b and the rotor bushing 222a. At this point, since the upper and lower ends 228a and 228b of the rotor bushing 222a extend beyond the upper and lower hemispherical bearings 224a and 224b, respectively, the fact that the edges 227a and 227a' are chamfered, does not cause the size of the acting area (interface) to be reduced.

As described above, in the present invention, even through edges are chamfered, the acting area is not reduced, so the rotational supporting efficiency of the bearing can be maintained.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An electrical motor comprising:

a rotor bushing defining a vertical axis and having top and bottom surfaces spaced axially apart by a first axial distance and facing in opposite axially outward directions, first and second hemispherical grooves formed in the top and bottom surfaces, respectively, the first and second grooves intersecting the top and bottom surfaces, respectively, to form top and bottom edges;

first and second bearings disposed in the first and second grooves, respectively, and including respective first and second hemispherical surfaces facing respective grooves, the first and second bearings further including respective end surfaces facing in opposite axially outward directions, the end surfaces being spaced axially apart by a second axial distance, the first and second hemispherical surfaces intersecting respective ones of the end surfaces to form first and second edges situated adjacent the top and bottom edges, respectively;

a supporting shaft extending coaxially through the rotor bushing and fixed to the bearings;

the rotor bushing being rotatably driven relative to the bearings in response to the application of an electrical drive force;

wherein the first and second edges are chamfered, and the top and bottom surfaces are non-chamfered;

the first axial distance being shorter than the second axial distance whereby the chamfered first and second edges are situated axially outwardly beyond the respective top and bottom edges.

2. An electrical motor comprising:

a rotor bushing defining a vertical axis and having top and bottom surfaces spaced axially apart by a first axial distance and facing in opposite axially outward directions, first and second hemispherical grooves formed in the top and bottom surfaces, respectively, the first and second grooves intersecting the top and bottom surfaces, respectively, to form top and bottom edges;

first and second bearings disposed in the first and second grooves, respectively, and including respective first and second hemispherical surfaces facing respective grooves, the first and second bearings including respective end surfaces facing in opposite axially outward directions, the end surfaces being spaced axially apart by a second axial distance, the first and second hemispherical surfaces intersecting respective ones of the end surfaces to form first and second edges situated adjacent the top and bottom edges, respectively;

a supporting shaft extending coaxially through the rotor bushing and fixed to the bearings;

the rotor bushing being rotatably driven relative to the bearings in response to the application of an electrical drive force;

wherein the top and bottom edges are chamfered, and the first and second edges are non-chamfered;

the second axial distance being shorter than the first axial distance whereby the chamfered top and bottom edges are situated axially outwardly beyond the respective first and second edges.

* * * * *